United States Patent [19]

Hagner

[11] 4,452,474
[45] Jun. 5, 1984

[54] HIGH PRESSURE FLOW LINE CONNECTION

[76] Inventor: Robert C. Hagner, P.O. Box 40082, Houston, Tex. 77240

[21] Appl. No.: 411,498

[22] Filed: Aug. 25, 1982

[51] Int. Cl.³ .............................................. F16L 25/00
[52] U.S. Cl. ............................... 285/334.1; 285/334.4; 285/368
[58] Field of Search .................. 285/334.1, 334.4, 368; 277/235

[56] References Cited

U.S. PATENT DOCUMENTS

| | | | |
|---|---|---|---|
| 1,301,245 | 4/1919 | Fox | 285/334.1 X |
| 2,046,597 | 7/1936 | Abegg | 285/134 |
| 2,582,995 | 1/1952 | Laurent | 220/25 |
| 2,687,229 | 8/1954 | Laurent | 220/46 |
| 2,760,673 | 8/1956 | Laurent | 285/334.1 X |
| 3,797,835 | 3/1974 | Wehner | 285/334.4 X |
| 3,873,105 | 3/1975 | Wehner | 285/333.4 X |

Primary Examiner—Dave W. Arola
Attorney, Agent, or Firm—Bernard A. Reiter

[57] ABSTRACT

Disclosed is a high pressure flow line connection. The connection includes a tubular male member, a tubular female member and a seal ring positioned between the male and female members. The male and female members have mating frusto-conical tapered surfaces, with the angle of taper of the female member being less than that of the male member. The seal ring has inner and outer tapered surfaces having angles of taper equal to those of the male and female members, respectively. The seal ring includes a radially outwardly extending lip adjacent the maximum outside diameter thereof. The male member, female member, and seal ring are cooperatively figured such that the seal ring lip remains spaced apart from the female member but optimum sealing engagement is achieved.

6 Claims, 2 Drawing Figures

HIGH PRESSURE FLOW LINE CONNECTION

BACKGROUND OF THE INVENTION

A. Field of the Invention

The present invention relates generally to high pressure flow line connections or closures, and more particularly to high pressure flow line connections or closures which include a male member having a tapered annular exterior surface, a female member having a tapered annular interior surface, and a seal ring of generally trapezoidal cross-section positioned therebetween.

B. Description of the Prior Art

In the field of high pressure fluid handling, as for example in industrial heat exchangers, there have been developed a number of connection or closure arrangements for connecting together flow lines or conduits. One arrangement includes a male member, a female member, and a seal ring. The male member has an end with an inwardly tapered frusto-conical exterior surface. The female member has an end with an outwardly tapered frusto conical interior surface having an angle of taper with respect to the axis of the member that is less than the angle of taper of the end of the male portion. The seal ring is generally trapezoidal in cross-section and has an outer surface with an angle of taper substantially equal to that of the inner surface of the female member, and an inner surface having an angle of taper that is substantially equal to the angle of taper of the end of the male member. As the male and female members are urged into mating engagement, as, for example by flanges, the seal ring is wedged tightly therebetween.

A shortcoming of the trapezoidal seal ring connection of the prior art is in the difficulty encountered in properly seating the seal ring between the mating surfaces of the male and female members. If the seal ring is axially misaligned when the parts are put together, the seal ring will be subjected to uneven stresses as the male and female members are urged into tight mating engagement, which may cause the seal ring to fail by fracturing or curling. Additionally, if the seal ring is axially misaligned, but does not fracture or curl, the connection still may leak, which at extreme high pressures may cause a blow out.

An improved connection or closure of the type described was developed in which the seal ring was formed to include a radially extending lip. The lip provided a visual indication of the proper alignment of the parts as the male and female members were urged into engagement. However, the prior lipped trapezoidal ring connections or closures were subject to seal leakage and/or blow out because of improper size relationships between the male member, seal ring, and female member. During the tightening of the connection, the lip moves toward the female member. If the initial spacing between the lip and female member is too small, then during tightening, the lip and female member will contact and the lip may be sheared off or the forces exerted by the female member on the lip may cause the ring to fracture. If, on the other hand, the initial spacing between the lip and the female member is too great, then there may be insufficient surface contact between the seal ring and female member to provide an adequate seal.

It is, therefore, an object of the present invention to provide a connection or closure that overcomes the shortcomings of the prior art. More specifically, it is an object of the present invention to provide a connection or closure arrangement wherein the combination of the male member, seal ring, and female member are sized relative to each other such that proper axial alignment among the parts is maintained and an adequate seal is achieved.

SUMMARY OF THE INVENTION

The foregoing and other objects are achieved by the high pressure flow line connection of the present invention. The connection includes a male member, a female member, and a seal ring. The male member has an end portion with an inwardly tapered frusto-conical exterior surface having an angle of taper. The male member exterior surface has a maximum outside diameter and a minimum outside diameter. The minimum and maximum outside diameters are subject to a manufacturing tolerance. The female member includes a end portion having an outwardly tapered frusto-conical interior surface having an angle of taper that is less than the angle of taper of the male member end portion. The female member end portion interior surface terminates at an outer end having a maximum inside diameter. The seal ring has a frusto-conical inner surface having an angle of taper substantially equal to the angle of taper of the male member end portion and a frusto-conical outer surface having an angle of taper substantially equal to the angle of taper of the female member end portion. The seal ring has an annular rim which extends radially outwardly from the seal ring outer surface adjacent the maximum outside diameter.

The respective relative dimensions of the seal ring and frusto conical surfaces of the male and female members are selected so as to maximize the effectiveness of the seal created and minimize the chances that the seal ring may be axially misaligned or become damaged during assembly and use. More specifically, the axial length of the seal ring is less than the axial length of the male member end portion and the maximum inside diameter of the seal ring interior surface is less than the maximum outside diameter of the male member end portion, while the minimum inside diameter of the seal ring is greater than the minimum outside diameter of the male member end portion. Thus, the inner surface of the seal ring is positioned entirely between the maximum and minimum outside diameters of the male member end portion. The maximum outside diameter of the seal ring outer surface adjacent the lip is greater than the maximum inside diameter of the female member end portion, such that the lip remains spaced apart from the end of the end portion of the female member as the male and female members are urged together. However, the difference between the maximum outside diameter of the seal ring and maximum inside diameter of the female member end portion is chosen so as to provide a sufficient length of engagement between the seal ring outer surface and female member end portion inside surface as to provide an adequate seal.

DESCRIPTION OF THE PREFERRED EMBODIMENT

Figure 1:
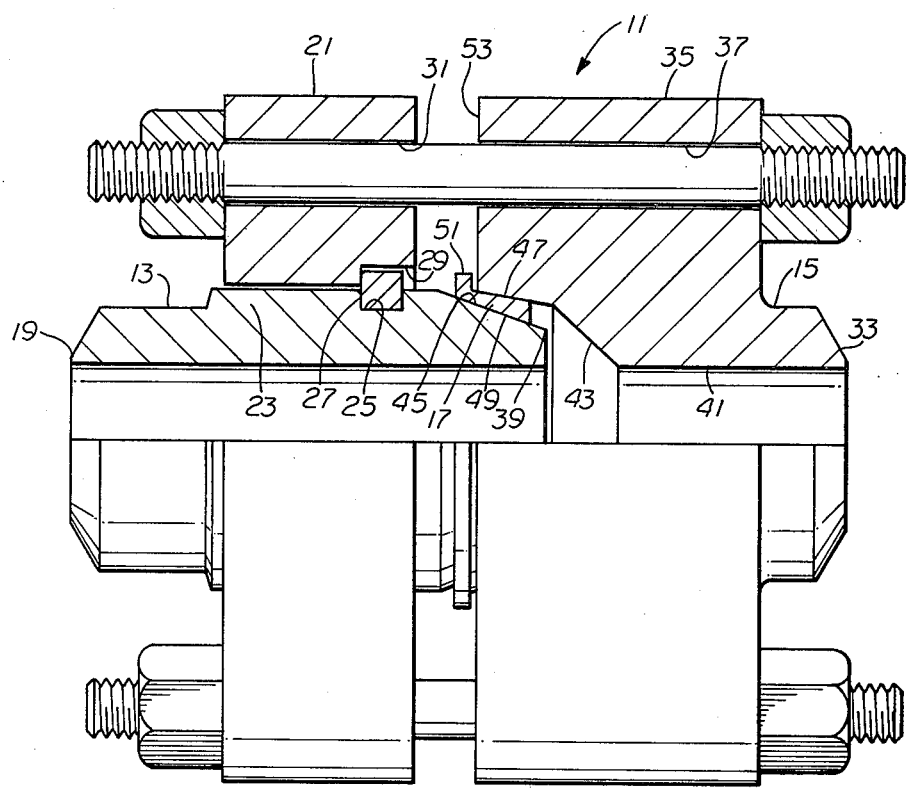
FIG. 1 is a quarter sectional view of a high pressure flow line connection incorporating the present invention.

Referring now to the drawings, and first to FIG. 1, a high pressure flow line connection which embodies the present invention is designated generally by the numeral 11. Connection 11 includes generally a male member 13, a female member 15, and a seal ring 17.

Male member 13 is generally tubular and is adapted for connection to a high pressure conduit by welding or the like at 19. In the embodiment shown in FIG. 1, male member 13 includes an enlarged diameter portion 23, which has formed therein an annular groove 25. Groove 25 is adapted to receive a split retainer ring 27. Retainer ring 27 functions to provide a shoulder which cooperates with an annular retainer recess 29 to transmit axial forces between retainer ring 27 and male member 13. Retainer flange 21 has a plurality of bolt holes, including bolt hole 31. Flange ring 21, retainer ring 27, and groove 25, thus cooperate to a removable flange. Those skilled in the art will recognize, of course, that male member 13 could be formed to include a unitary fixed flange.

Female member 15 is generally tubular and is adapted for attachment to a high pressure conduit as by welding at 33. Female member 15 includes a radially extending unitary flange 35 which has a plurality of bolt holes, including bolt hole 37 therein. Flange 35 is thus adapted to be interconnected with flange ring 21 by a plurality of bolts or the like, thereby to connect and urge axially together male member 13 and female member 15.

Female member 15 includes a radially enlarged outwardly tapered end portion 39. End portion 39 forms a frusto-conical interior surface having an angle of taper with respect to the axis of female member 15. End portion 39 is connected to the bore 41 of female member 15 by a steeply tapered frusto conical transition section 43.

Male member 13 includes an inwardly tapered end portion 45 which forms a frusto conical exterior surface. The angle of taper of end portion 45 with respect to the axis of male member 13 is greater than the angle of taper of end portion 39 of female member 15.

Seal ring 17 includes a frusto conical outer surface 47 and a frusto conical inner surface 49. The angles of taper of outer surface 47 and inner surface 49 are substantially equal to the angles of taper of end portion 39 of female member 15 and end portion 45 of male member 13, respectively. Seal ring 17 is thus wedged between end portion 45 of male member 13 and end portion 39 of female member 15. Internal pressure within connection 11 acts on seal ring 17 to urge seal ring into tighter engagement with end portions 45 and 39, thereby to make seal ring 17 effectively self-energizing. The greater the internal pressure, the more effective is the seal.

Seal ring 17 includes a radially outwardly extending lip 51. Lip 51 is positioned on seal ring 17 so as to be spaced apart from the end 53 of female member 15. During assembly of connection 11, the worker can inspect the position of lip 51 with respect to male member 13 and female member 15 and can verify that the spacing between lip 51 and end 53 of female member 15 is substantially equal all the way around connection 11. Lip 51 thus provides a visual indication that the parts are properly aligned.

Figure 2:
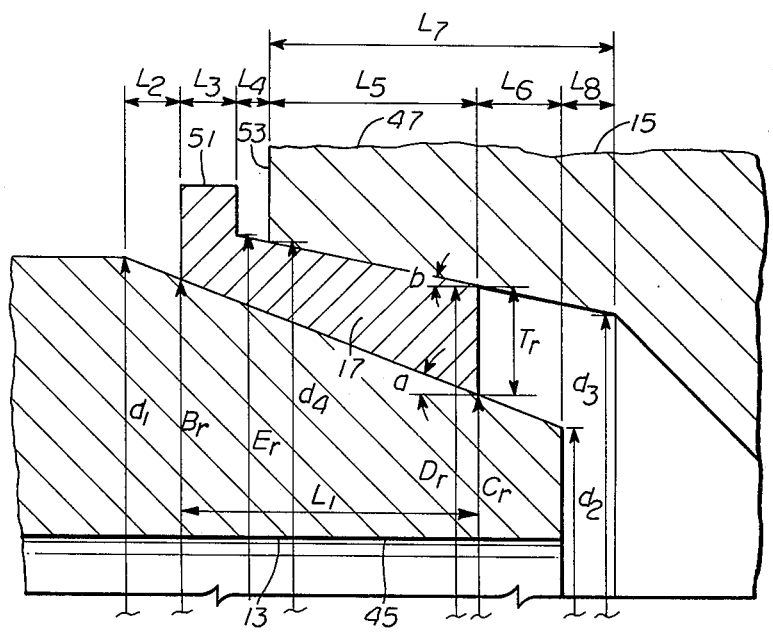
FIG. 2 is a detailed sectional view of the male member, seal ring, and female member arrangement of the preferred embodiment of the present invention.

Referring now to FIG. 2, there is illustrated the details of the construction of the preferred embodiment of the present invention. The angle of taper of end portion 45 of male member 13 is designated as angle a, and in the preferred embodiment is 20 degrees. The angle of taper of end portion 47 of female member 15 is designated angle b, and in the preferred embodiment is 10 degrees. It has been determined empirically that there is an optimum cross-sectional configuration for seal ring 17 regardless of diameter. In the optimum configuration, the axial length of seal ring 17, which is designated $L_1$, is 0.687 inches, and the maximum seal ring thickness, which is designated $T_r$, is 0.281 inches. The optimum spacing between lip 51 and end 53 of female member 15, which is designated $L_4$, is 0.131 inches. In the preferred embodiment, the thickness of lip 51, which is designated $L_3$, is 0.125 inches. For a given maximum outside diameter of male member 13, which is designated $d_1$, it is necessary to determine the axial length of end portion 45 of male member 13, the maximum inside diameter of end portion 47 of female member 15, which is designated $d_4$, the axial depth of end portion 47 of female member 15, and at least one diameter of seal ring 17, as for example the maximum inside diameter of seal ring 17, which is designated $B_r$.

In determining the axial length of end portion 45 of male member 13, it has been determined that seal ring 17 should be positioned entirely on the tapered surface of end portion 45. Thus, the axial length of end portion 45 of male member 13 should be equal to or greater than $L_1$, the axial length of seal ring 17.

In the preferred embodiment, the axial length of end portion 45 of male member 13 is equal to $L_1+L_2+L_6$, wherein $L_2$ is the axial distance between $d_1$, the maximum diameter of end portion 45, and $B_r$, the maximum inside diameter of seal ring 17, and $L_6$ is the axial distance between $d_2$, the minimum outside diameter of end portion 45, and $C_r$, the minimum inside diameter of seal ring 17. The minimum length of $L_2$ is determined by the combined manufacturing tolerances on the diameter of male member 13 and seal ring 17. For example, in the preferred embodiment, the manufacturing tolerance on the diameter of male member 13 is plus 0.000 inches and minus 0.010 inches, and the manufacturing tolerance on the diameter of seal ring 17 is plus or minus 0.003 inches. $B_r$ must always be equal to or less than $d_1$. Thus, $B_r$ must be equal to or less than $d_1$ minus the total negative tolerance of male member 13 and seal ring 17. From trigonometry, the minimum $L_2$ is expressed as follows:

$L_2=(tol_n/2)\cot a$, wherein $tol_n$ is the absolute value of the total negative tolerance of male member 13 and seal ring 17.

$L_6$, the distance between $C_r$, the minimum inside diameter of seal ring 17 and $D_2$, the minimum outside diameter of end portion 45 of male member 13, is made up of two components. One component, which for purposes of calculation shall be called $L_{6T}$ is due to the combined positive manufacturing tolerances of male member 13 and seal ring 17, and is expressed mathematically as follows:

$L_{6T}=(tol_p/2)\cot a$, wherein $tol_p$ is the absolute value of the total positive tolerance of male member 13 and seal ring 17.

The other component of $L_6$ is due to movement of seal ring 17 as male member 13 and female member 15 are moved coaxially together. As male member 13 and female member 15 are moved coaxially together, seal ring 17 will be urged in the direction toward female member 15 until $L_4$ is equal to 0. The component of $L_6$ due to ring movement is referred to, for the purposes of calculation, as $L_{6M}$, and is expressed as follows:

$$L_{6M} = L_4 \tan b \cot a.$$

Thus, $L_6 = L_{6T} + L_{6M} = (tol_p/2) \cot a + L_4 \tan b \cot a$.

The axial length of end portion 45 of male member 13 is thus $L_2 + L_1 + L_6$. By inspection, $D_2$, the minimum outside diameter of end portion 45 of male member 13 may be expressed as follows:

$$d_2 = d_1 - 2(L_2 + L_1 + L_6) \cot a.$$

Having determined the dimensions of end portion 45 of male member 13, and having been given the optimum cross-sectional configuration of seal ring 17, the remaining dimensions of seal ring 17 are determined relatively simply. From the calculation of $L_2$, it can be seen that $B_r$, the maximum inside diameter of seal ring 17 may be expressed as follows:

$B_r = d_1 - 2L_2 \tan a = d_1 - (tol_p)$. Similarly, the minimum inside diameter of seal ring 17 may be expressed as follows:

$$C_r = d_1 - 2(L_1 + L_2) \tan a.$$

The minimum outside diameter of seal ring 17, which is expressed as $D_r$, is thus expressed as follows:

$D_r = C_r + T_r$, where $T_r$ is the maximum thickness of seal ring 17. The maximum outside diameter of seal ring 17 adjacent rim 51, which is designated $E_r$, is as follows:

$E_r = D_r + 2(L_1 - L_3) \tan b$, where $L_3$, the thickness of lip 51 is given to be 0.125 inches.

Having determined the dimensions of end portion 45 of male member 13 and seal ring 17, there remains only to be computed the dimensions of end portion 47 of female member 15. The maximum inside diameter of end portion 47 of female member 15, which is designated $B_4$, must be selected so as to maintain optimum spacing between lip 51 and end 53 of end portion 47. Thus, the maximum inside diameter is expressed as follows:

$d_4 = E_r - 2L_4 \tan b$. Having determined $B_4$, there remains only to be determined the depth of end portion 47 of female member 15, which is designated $L_7$. $L_7$ may be expressed in the following equation:

$$L_7 = L_5 + L_6 + l_8.$$

$L_5$ is the axial length of contact between the outer surface of seal ring 17 and the inner surface of end portion 47 of female 15 and is given as follows:

$$L_5 = L_1 - L_3 - L_4.$$

$L_6$, the axial distance between the minimum inside diameter of seal ring 17 and the minimum outside diameter of end portion 45 of male member 13 was given above. $L_8$, is expressed as follows:

$$L_8 = L_6 - L_4.$$

Having determined the depth $L_7$ of end portion 47 of female member 15, the remaining dimension, $d_3$, the minimum inside diameter of end portion 47 of female member 15 is as follows:

$$d_3 = d_4 - 2L_7 \tan b.$$

It is, of course, the intention of the inventor hereof that the ambit of the present invention shall cover obvious modifications of the embodiment shown and described herein, provided that such modifications fall within the spirit and scope of the claims appended hereto.

What is claimed is:

1. A high pressure flow line connection useful in the prevention of seal leakage and blow out problems, said connection comprising:

a tubular male member having an end portion with an inwardly tapered frusto-conical exterior surface having a maximum outside diameter and an angle of taper with respect to the axis of the male member and an axial length, said tapered exterior surface terminating in an end having a minimum outside diameter, said minimum and maximum outside diameters being subject to manufacturing tolerances;

a tubular female member coaxially generally matingly aligned with said male member and including an end portion having an outwardly tapered frusto-conical interior surface having an angle of taper with respect to the axis of the female member that is less than the angle of taper of the end portion of the male member and said female member end portion interior surface terminating at an outer end having a maximum inside diameter;

means for urging said male and female members coaxially matingly toward each other;

and a seal ring including a frusto-conical inner surface having an angle of taper substantially equal to the angle of taper of the male member end portion exterior surface and a frusto-conical outer surface having an angle of taper substantially equal to the angle of taper of the female member end portion interior surface and said seal ring including an annular lip extending radially outwardly from said seal ring outer surface adjacent the maximum outside diameter of said seal ring surface, said seal ring being positioned coaxially between said male and female members with said seal ring inner surface engaging said male member end portion exterior surface and a portion of said seal ring outer surface engaging said female member end portion interior surface, said seal ring having an axial length less than the axial length of the male member end portion and having a minimum inside diameter greater than the minimum outside diameter of said male member end portion and a maximum inside diameter less than the maximum outside diameter of said male member end portion, whereby said inner surface of said seal ring is positioned on said male member end portion entirely between said maximum and minimum outside diameters of said male member end portion, said minimum and maximum inside diameters of said seal ring being subject to manufacturing tolerances, and the maximum outside diameter of said seal ring outer surface adjacent said lip is greater than the maximum inside diameter of said female member end portion such that said lip remains spaced apart from the end of the end portion of the female member as said male and female members are urged together but a sufficient portion of said seal ring outer surface engages said female member tapered surface to provide a seal there between.

2. The high pressure flow line connection as claimed in claim 1, wherein the seal ring maximum inside diameter is no greater than the male member maximum outside diameter less the sum of the absolute values of the negative tolerances of the male member maximum outside diameter and the seal ring maximum inside diameter.

3. The high pressure flow line connection as claimed in claim 2, wherein the axial length of said male member end portion is equal to the sum of:
   (a) the axial length of said seal ring;
   (b) one-half the sum of the absolute values of the negative tolerances of the male member maximum outside diameter and the seal ring maximum inside diameter, multiplied by the cotangent of the angle of taper of the male member end portion;
   (c) one-half the sum of the absolute values of the positive tolerance of the male member minimum outside diameter and the seal ring minimum inside diameter, multiplied by the cotangent of the angle of taper of the male member end portion; and
   (d) the product of the distance by which the lip is spaced apart from the end of the end portion of the female member, the cotangent of the angle of taper of the male member end portion, and the tangent of the angle of taper of the female member end portion.

4. The high pressure connection as claimed in claim 1, wherein the maximum inside diameter of the female member end portion is equal to the maximum outside diameter of the seal ring outer surface adjacent the lip less the product of twice the distance by which the lip is spaced apart from the end of the female member end portion and the tangent of the angle of taper of the female member end portion.

5. The high pressure connection as claimed in claims 1, 2, 3 or 4, wherein the distance by which the lip is spaced apart from the end of the female member end portion is substantially equal to 0.131 inch.

6. The high pressure flow line connection as claimed in claim 5, wherein the axial length of the seal ring is substantially equal to 0.6875 inch and the axial length of the lip is substantially equal to 0.125 inch.

* * * * *